July 12, 1927.

A. T. KASLEY 1,635,551

QUILL DRIVE

Filed March 1, 1923

WITNESSES:

INVENTOR
Alexander T. Kasley.
BY
ATTORNEY

Patented July 12, 1927.

1,635,551

UNITED STATES PATENT OFFICE.

ALEXANDER T. KASLEY, OF ESSINGTON, PENNSYLVANIA, ASSIGNOR TO WESTINGHOUSE ELECTRIC & MANUFACTURING COMPANY, A CORPORATION OF PENNSYLVANIA.

QUILL DRIVE.

Application filed March 1, 1923. Serial No. 622,061.

My invention relates to flexible drive elements, more especially to flexible drive mechanisms for electrically propelled railway vehicles.

It is among the objects of my invention to provide a flexible drive mechanism intermediate the electrical propelling mechanism and the main drive wheels which shall be of strong, durable mechanical design, which shall be relatively simple and compact, and which shall consist of a minimum number of parts, all of which are readily accessible and renewable for service requirements.

It is a further object of this invention to provide a flexible drive element of the character described that shall be efficient in its operation of providing relative movement between the drive wheels and the motors without inflicting any serious strains or stresses upon the various operating parts.

It has been the object, in electrically-driven railway vehicles, to provide resilient or yielding means between the driving and the driven members to protect the gear elements, and the electrical equipment from the shock and strain incident to the operating conditions to which it is subjected.

My present invention is directed to such a flexible drive mechanism which adequately protects the driving mechanism without embodying the complex and intricate devices employed in prior structures.

Figure 1:
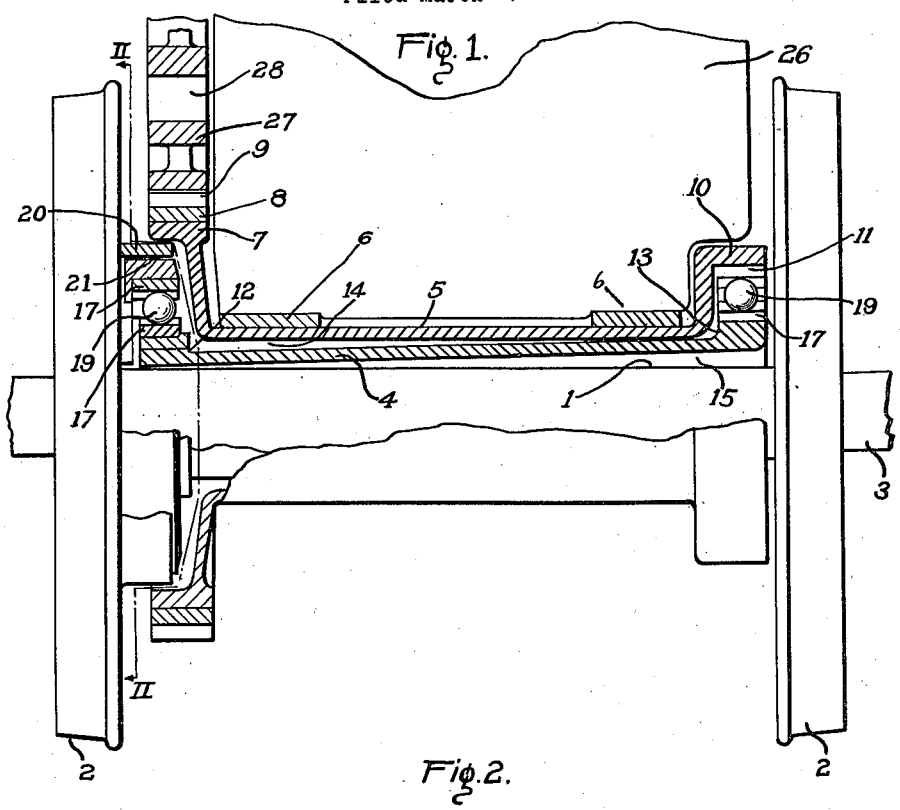
Figure 2:
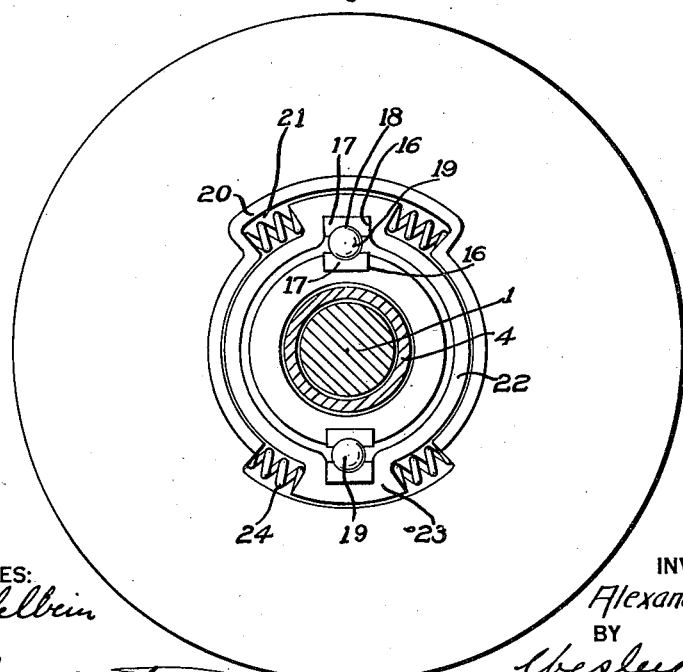

In the accompanying drawings constituting a part hereof and in which like reference characters designate like parts, Figure 1 is a view, partially in end elevation and partially in section, of a flexible drive mechanism embodying the principles of this invention; and Fig. 2 is a sectional view thereof, taken along the line II—II of Fig. 1.

Referring to Fig. 1, my invention embodies a driver comprising an axle 1, provided with a plurality of wheels 2 and having extensions 3 thereon adapted to be rotatably journaled in the driving boxes mounted between the vertical pedestal jaws of the side frame members (not shown) in the usual manner. A plurality of quills 4 and 5 are disposed around the axle 1 and journaled independently thereof in the bearings 6. The outer quill 5 is provided with an expanded rim portion 7 having a rim member 8 shrunk thereon and provided with a plurality of gear tooth elements. The other end 10 of the quill 5 is likewise expanded and provided with a recess 11. The quill member 4 is provided with flange portions 12 and 13 on its respective ends, the latter being in alinement with the recess 11 of the quill 5.

The quills 4 and 5 are tapered to provide working spaces or clearances 14 and 15 between the quills and shaft, respectively, and the ends 10 and 13 of the quills 4 and 5 are provided with a pair of notches 16, each of which is adapted to receive a bearing member 17 having a cylindrical recess 18 therein adapted to receive a ball member 19. One of the drive wheels 2 is provided with an extending hub portion 20 having a pair of oppositely disposed recesses 21, each of which is adapted to receive a ring member 22 having a radially-extending lug 23 thereon.

A plurality of coil springs 24 are interposed between the shoulder portions of the extension 20 and the lugs 23 to provide yielding rotative movement between these members. The ring 22 is also provided with a pair of notches or recesses 16, each of which is adapted to receive a bearing member 17 having a cylindrical groove 18, by means of which it is connected to the flange portion 12 of the quill 4 with one of the balls 19. The quill 5 is mounted in proximity to the driving motor 26, which has a pinion member 27 secured on its armature shaft 28, the pinion being in alinement and in co-operative engagement with the teeth 9 of the gear rim 8.

The operation of this mechanism is briefly as follows: The torque of the driving motor 26 is transmitted through the pinion 27, the gear rim 8 secured on the quill 5, thence through a ball joint constituted by the bearings 17 and balls 19, connecting the flanges 10 and 13 of the quills 4 and 5, from which it is transmitted through another ball joint, to the drive wheel 2. The operating clearances 14 and 15 between the quills and the axle 1 and the cylindrical ball grooves 18 permits of relative movement between the respective members which are, in effect, hinged at the ball joints, and torsional deflection is provided for by the coil springs 21 intermediate the drive wheel 2 and the quill 4.

Any sudden change of position of the drive wheels due to variations of rail contour is not transmitted direct to the gear members but is taken up by the flexible quills in the spaces 14 and 15 provided therebetween. The flexible construction of the parts such as the ball joints and coil springs 21 provides an ample cushioning medium between the drivers and the driving motor to protect it from sudden shock or impact resulting from the wheels passing over the rail joints and also flange thrust, due to the wheels riding from a tangent to a curve, or vice versa.

It will be readily understood, from the above description of my invention, that a driving mechanism made in accordance therewith provides flexibility of design and operation to adequately meet service requirements and that such mechanism can be readily adapted to standard vehicles embodying electrical drives without necessitating any material alterations.

Although I have described a specific embodiment of my invention, it will be obvious to those skilled in the art that various modifications may be made in the details of construction. For instance, a double gear connection may be provided instead of the single gear drive illustrated, by mounting a gear wheel on the other end of the outer quill member to engage another driving pinion. The essential features of the quill mechanism and the ball joints would remain the same with but slight modifications. The quill members need not be tapered, as shown, but the clearances necessary may be provided by varying the diameters of the quills and effecting a connection therebetween by providing suitable offset portions at their respective ends. Any suitable form of spring connection may be provided in place of that shown, as deflecting devices of this character are common in the art. These and other changes may be made without departing from the principles herein set forth.

I claim as my invention:—

1. A flexible drive element comprising a wheeled axle, a plurality of tapered quills disposed around said axle and journaled independently thereof, the large end of one quill being movably joined to the small end of another, and means for movably joining said last-named quill with said axle.

2. A flexible drive element comprising a wheeled axle, a plurality of tapered quills disposed around said axle and journaled independently thereof, the large end of one quill being movably joined to the small end of another, and means for movably joining said last-named quill with said axle, said quills and axle being relatively movable to each other.

3. A flexible drive element comprising a wheeled axle, a plurality of tapered quills disposed around said axle and journaled independently thereof, the large end of one quill being connected by a ball joint to another quill which is similarly joined to one of the wheels of said axle.

In testimony whereof, I have hereunto subscribed my name this 19th day of February, 1923.

ALEXANDER T. KASLEY.